United States Patent Office 3,492,311
Patented Jan. 27, 1970

3,492,311
CYCLIC SULFITE OR PHOSPHONATE OF 2,2-DINITRO-1,3-PROPANEDIOL
Edward E. Hamel, Citrus Heights, Calif., assignor to Aerojet-General Corporation, Azusa, Calif., a corporation of Ohio
No Drawing. Filed Nov. 26, 1963, Ser. No. 326,285
Int. Cl. C07d 89/08, 105/04
U.S. Cl. 260—327    11 Claims This invention relates to certain novel heterocyclic polynitro compounds and their method of preparation.

It is an object of this invention to prepare certain novel organic heterocyclic compounds. It is still another object of this invention to prepare new nitro compounds in a novel manner. These and other objects of this invention will be apparent from the detailed description which follows.

The novel heterocyclic compounds of this invention have the following general formula (I)
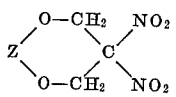

wherein Z is

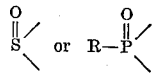

wherein R is alkyl, preferably having from 1 to 20 carbons or aryl, preferably phenyl. Illustrative of the alkyl R groups in Formula I are methyl, ethyl, hexyl and dodecyl. Typical aryl groups not only phenyl but also napthyl and anthracyl.

The novel heterocyclic compounds of the above formula are prepared in accordance with the following general reaction.

(II)
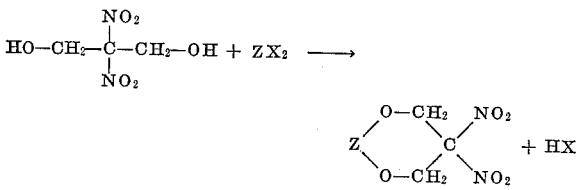

wherein Z is as defined above, and X is halogen, preferably chloro or bromo.

In Reaction II, ZX₂ may be, for example, phenyl phosphonic dichloride, phenyl phosphonic dibromide, ethyl phosphonic dichloride, decyl phosphonic dichloride, thionyl chloride or thionyl bromide.

The above reaction is conveniently carried out in any inert solvent in which the reactants are soluble, i.e., 1,2-dichloroethane, carbon tetrachloride, etc. The proportions of the reactants employed in the reaction are not critical. Normally, stoichiometrically equivalent amounts are used since this results in the most economical utilization of the reactants. The reaction temperature should normally be sufficiently high so that the reactants will dissolve to a substantial degree in the reaction medium, but in any event, the reaction temperature should be below the composition temperature of the reactant. Normally, the reaction is conducted at a temperature between about 0° C. and about 100° C. The most preferred temperature is from about +40° C. to about 90° C. Pressure is not critical in this reaction. Therefore, while any pressure can be used, the reaction is normally run under atmospheric pressure.

The above reaction is preferably, although not necessarily prepared in the presence of an acid neutralizing agent such as pyridine. This agent serves to take up the by-product HX as it is evolved.

The compounds of this invention are isolated in conventional manner such as by filtration, distillation and/or extraction.

EXAMPLE I

Preparation of the cyclic phenyl phosphonate of 2,2-dinitro-1,3-propanediol

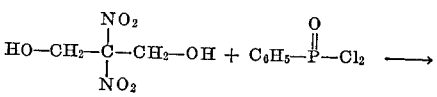

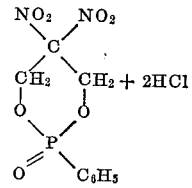

In a 500 ml. flask equipped with a stirrer, dropping funnel, thermometer and reflux condenser was placed 100 ml. of 1,2-dichloroethane and 16.6 g. (0.1 mole) of 2,2-dinitro-1,3-propanediol. The mixture was stirred and heated to 60° C. at which point all of the diol had dissolved. A solution of 15.8 g. (0.2 mole) of pyridine in 10 ml. of 1,2-dichloroethane was added rapidly while maintaining the temperature at 60 to 65° C. The heating bath was removed and 19.5 g. (0.1 mole) of phenyl phosphonic dichloride was added over an eight-minute period; during this period the heat of reaction raised the temperature to 71° C. The solution was cooled to 25° C. over a 15-minute period. The heavy precipitate of pyridine hydrochloride which had formed was suction filtered, washed with 1,2-dichloroethane and the washings combined with the filtrate. Slow evaporation of the filtrate gave the product as a flocculent precipitate which was filtered and washed three times with 150 ml. portions of water. The damp solid was dissolved in acetone and reprecipitated by the addition of excess water; the procedure was repeated and the solid was dried in vacuo to give 14 g. (48%) of the product, which melted at 151 to 151.5° C. A sample was recrystallized from 50-50 acetoneisopropyl ether for analysis.

Calc'd for $C_9H_9O_7N_2P$: C, 37.5; H, 3.14; N, 9.72; P, 10.7. Found: C, 37.1; H, 3.02; N, 9.90; P, 9.24.

The infrared scan of the product was in agreement with that expected for the cyclic phosphonate.

When the above example is repeated using ethyl phosphonic dichloride in place of phenyl phosphonic dichloride, the cyclic ethyl phosphonate of 2,2-dinitro-1,3-propanediol having the structural formula:

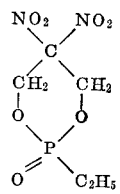

is obtained in good yield.

When Example I is again repeated using tertiary butyl phosphonic dichloride as the phosphorus-containing reactant, a compound of the formula

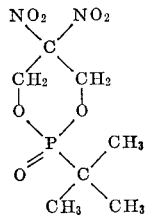

is obtained.

EXAMPLE II

Preparation of the cyclic sulfite of 2,2-dinitro-1,3-propanediol

A 500-ml. flask equipped with a dropping funnel, thermometer and reflux condenser vented to an off-gas bubbler was charged with 83.0 g. (0.5 mole) of 2,2-dinitro-1,3-propanediol (A-diol) and 300 ml. of dry, distilled 1,2-dichloroethane. The mixture was stirred and heated to 65° C. at which point all of the A-diol had dissolved, and 12 drops of pyridine were added. The solution was heated to 71° C. and 59.5 g. (0.5 mole) of thionyl chloride was added over a 35-minute period while the temperature was maintained at 69 to 76° C. The solution was then stirred for 1 hour and 40 minutes at 69 to 74° C.; at the end of this period, the evolution of HCl had ceased. The solution was cooled to ambient temperature, transferred to a separatory funnel and washed successively with 100 ml. of water, 100 ml. of saturated aqueous sodium bicarbonate solution and two 100-ml. portions of water. The organic layer was dried over calcium sulfate, filtered, and the filtrate treated with 1500 ml. of n-hexane; after stirring and cooling at −40° C., the solid which had formed was suction filtered and washed with 100 ml. of cold (−20° C.) hexane. The solid was dried in vacuo, first over phosphorous pentoxide then over sodium hydroxide pellets, to give 86.3 g. (81.3%) of pale orange crystals. The crystals were recrystallized three times by dissolving in isopropyl ether at 36° C. and cooling to −20° C.; the last recrystallization was carried out in the presence of decolorizing carbon to give 69.9 g. of white crystals, M.P. 37 to 38° C.

*Analysis.*—Calc'd for $C_3H_4N_2O_7S$: C, 17.0; H, 1.90; N, 13.3; S, 15.1. Found: C, 17.3; H, 2.06; N, 12.8; S, 14.7.

When the above example is repeated using thionyl bromide in lieu of thionyl chloride, the cyclic sulfite of 2,2-dinitro-1,3-propanediol is again obtained.

The novel heterocyclic compounds of this invention, which contain a plurality of nitro groups, are inherently useful as high explosives. These compounds can also be used in any conventional explosive missile, projectile, rocket, or the like, as the main explosive charge. An example of such a missile is described in the U.S. Patent 2,470,162, issued May 17, 1949. One way of using such high explosives in a device such as that disclosed in U.S. Patent 2,470,162 is to absorb the liquid explosive in an absorbent material such as cellulose, wood pulp, or sawdust. The resultant dynamite-type explosive can then be packed into the warhead of the missile. A charge thus prepared is sufficiently insensitive to withstand the shock entailed in the ejection of a shell from a gun barrel or a rocket launching tube under the pressure developed from ignition of a propellant charge, and can be caused to explode on operation of an impact or time-fuse mechanism firing a detonating explosive such as lead azide or mercury fulminate.

The heterocyclic compounds of this invention are also useful as fungicides and as plasticizers for solid propellants.

This example describes a particular method of preparing a novel propellant composition using one of the compounds of this invention as a part of the plasticizer ingredient.

EXAMPLE III

| Ingredients: | Wt. percent |
|---|---|
| Ammonium perchlorate | 65.00 |
| Aluminum | 13.00 |
| Copper chromite | 0.50 |
| Phenyl betanaphthylamine | 0.20 |
| Ferric acetylacetonate | 0.08 |
| Glycerol monoricinoleate | 1.08 |
| Polypropylene glycol (M.W.=2000) | 13.76 |
| Dioctyl azelate | 4.00 |
| Cyclic phenyl phosphonate of 2,2-dinitro-1,3-propanediol | 0.20 |
| Lecithin | 0.20 |
| Tolylene diisocyanate | 1.98 |
| | 100.00 |

The aluminum powder is stirred into about ⅓ of the required volume of polypropylene glycol and glycerol monoricinoleate. The mixture is prepared in a stainless steel container, using a copper-ebryllium spatula. Mixing is continued for about ten minutes.

The aluminum slurry is added to a conventional mixer equipped with facilities for heating, cooling and vacuumizing the propellant mix. The walls of the aluminum slurry container are scraped thoroughly. The container is rinsed with ½ of the required volume of dioctyl azelate and the rinses are added to the mixer. The remaining polypropylene glycol is added to the mixer. The cyclic phenyl phosphonate of 2,2-dinitro-1,3-propanediol is mixed with the remaining dioctyl azelate until homogeneous and the solution is then added to the mixer.

With the mixer off, the ferric acetylacetonate, phenyl betanaphthylamine, and lecithin are added through a 40-mesh screen. The copper chromite is added to the mixer.

The mixer is covered and mixed by remote control for 15 minutes under 26 to 28 inches of vacuum, after which it is stopped and the vacuum released with dry nitrogen. The cover is removed from the mixer and the oxidizer is added by remote control with the mixer blades in motion.

After all of the oxidizer has been added, the mixer is stopped and scraped down. The propellant mass is mixed for 15 minutes at 70° F. under 26 inches vacuum by remote control. The mixer is stopped and the vacuum released with dry nitrogen. The tolylene diisocyanate is added, after which the mass is mixed for ten minutes at 70° F. and 26 inches of vacuum by remote control. The vacuum is then released with dry nitrogen and the mixture is cast.

It will be understood that various modifications may be made in this invention without departing from the spirit thereof or the scope of the appended claims.

I claim:
1. Compounds of the formula

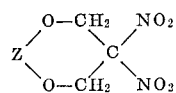

wherein Z is selected from the group consisting of

wherein R is selected from the group consisting of alkyl and aryl.

2. Compounds of the formula

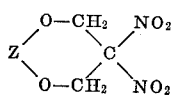

wherein Z is selected from the group consisting of

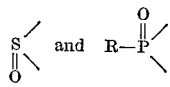

wherein R is selected from the group consisting of lower alkyl and phenyl.

3. The compound of the formula

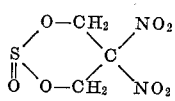

4. The compound of the formula

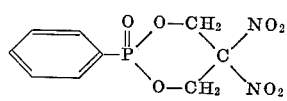

5. The method of preparing compounds of the formula

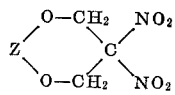

which comprises reacting 2,2-dinitro-1,3-propanediol with a compound of the formula $ZX_2$ wherein Z is selected from the group consisting of

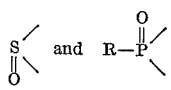

wherein R is selected from the group consisting of alkyl and aryl.

6. The method of preparing compounds of the formula

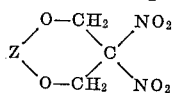

which comprises reacting 2,2-dinitro-1,3-propanediol with a compound of the formula $ZX_2$ wherein Z is selected from the group consisting of

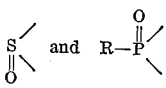

wherein R is selected from the group consisting of lower alkyl and phenyl.

7. The method of preparing compounds of the formula

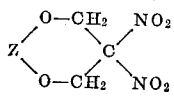

which comprises reacting 2,2-dinitro-1,3-propanediol with a compound of the formula $ZX_2$ wherein Z is selected from the group consisting of

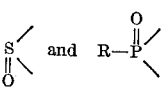

wherein R is phenyl.

8. The method of preparing a compound of the formula

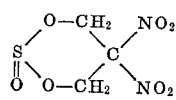

which comprises reacting 2,2-dinitro-1,3-propanediol with a thionyl halide.

9. The method of preparing a compound of the formula

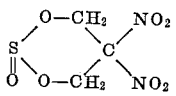

which comprises reacting 2,2-dinitro-1,3-propanediol with a thionyl chloride.

10. The method of preparing a compound of the formula

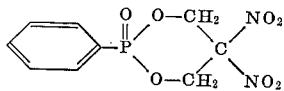

which comprises reacting 2,2-dinitro-1,3-propanediol with a phenyl phosphonic dihalide.

11. The method of preparing a compound of the formula

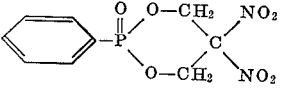

which comprises reacting 2,2-dinitro-1,3-propanediol with a phenyl phosphonic dichloride.

References Cited

UNITED STATES PATENTS 2,915,875   12/1959   Van Winkle et al. __ 149—109 X

LELAND A. SEBASTIAN, Primary Examiner

U.S. Cl. X.R

149—19, 20, 38, 109; 260—937